Aug. 28, 1928.
A. L. RITTER
1,682,538
CULTIVATOR AND WEEDER
Filed July 15, 1926      2 Sheets-Sheet 1
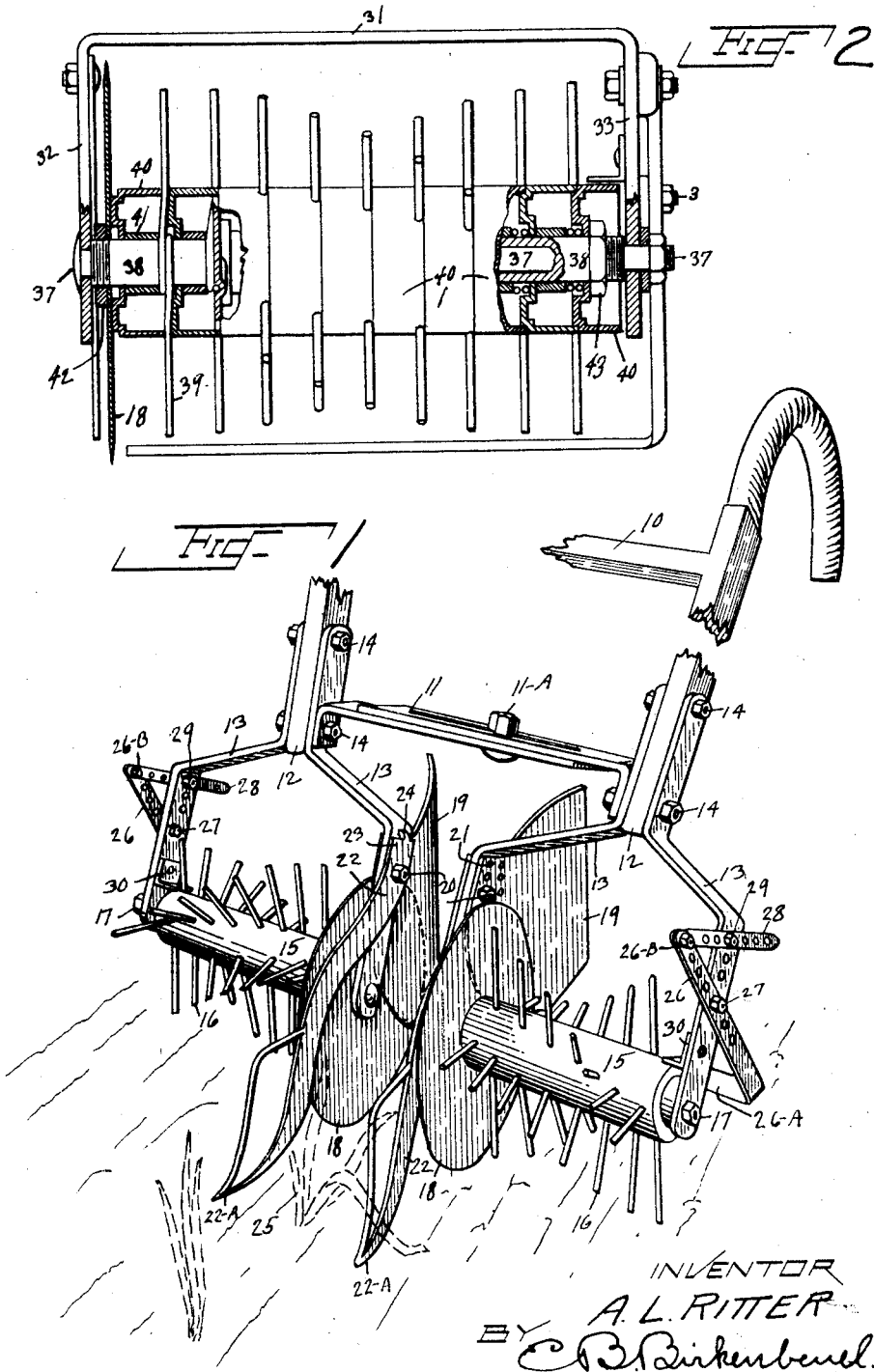
INVENTOR
A. L. RITTER
BY C. B. Birkenbeuel.
ATTORNEY

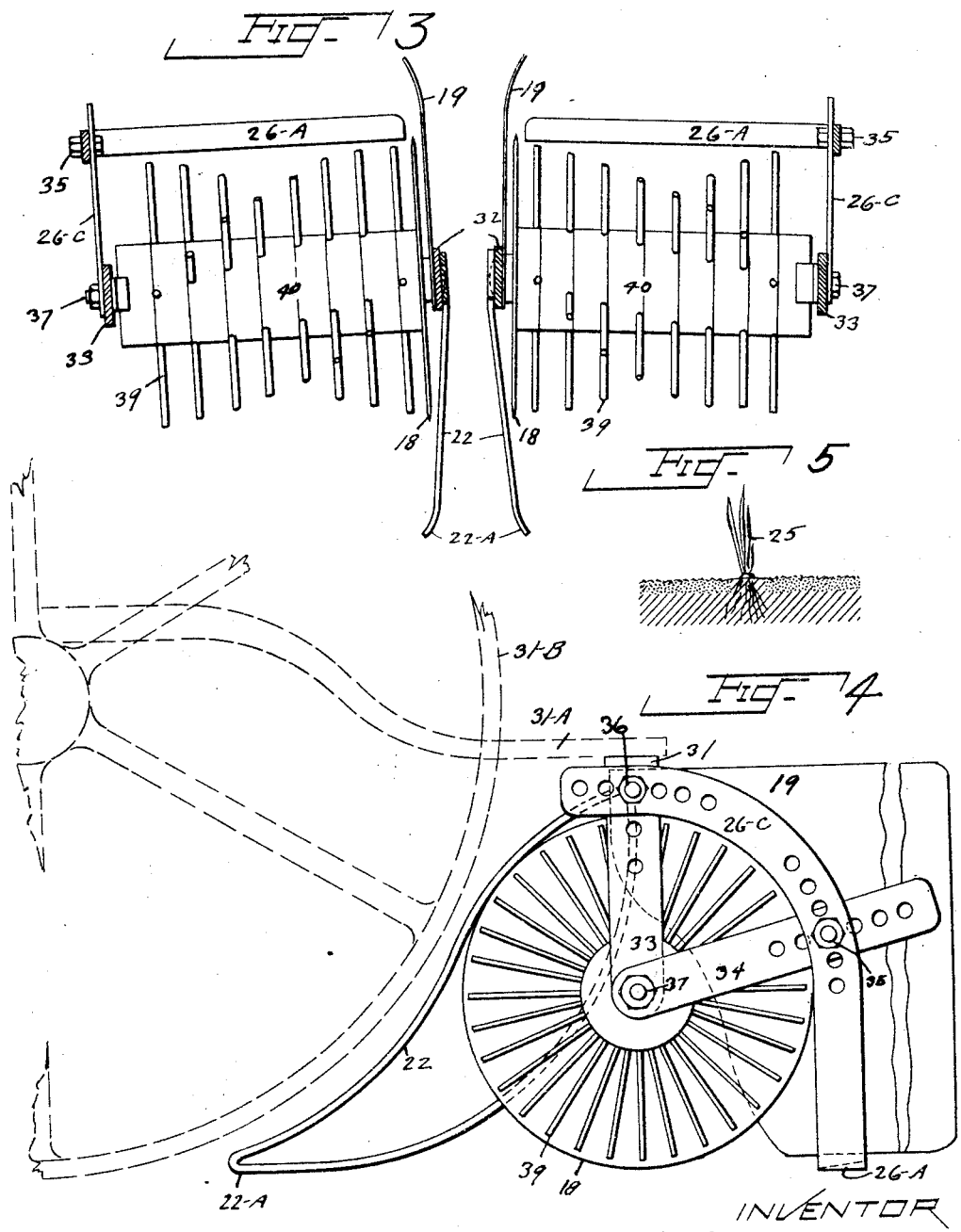

Patented Aug. 28, 1928.

1,682,538

UNITED STATES PATENT OFFICE.

ADOLPH L. RITTER, OF SIFTON, WASHINGTON.

CULTIVATOR AND WEEDER.

Application filed July 15, 1926. Serial No. 122,605.

This invention relates generally to cultivators and particularly to a special form thereof adapted for use in the cultivation and weeding of small plants such as onions, beets, carrots etc.

The main object is to provide a light, inexpensive and easily operated cultivator by the use of which a large portion of the hand labor for weeding can be eliminated.

The second object is to so construct a cultivator that it will move steadily along the row and not be subject to lateral or jumping movements such as ordinarily occur when a wheeled cultivator runs over a clod or stone, and by this steady movement making it possible to work much closer to a plant than would otherwise be safe.

The third object is to protect the plants against being covered with dirt and to pick up any leaning plants to avoid injury to same if the disks are being used.

The fourth object is to keep the weeds on top of the newly mulched earth where they will soon die.

The fifth object is to make the cultivating operation easy to perform in a fraction of the time required by tools unable to work close to the plants thereby allowing the gardener to cultivate his entire crop at such times when the climatic conditions and soil are most favorable.

The sixth object is to so construct the cultivator as to avoid as far as possible delays caused by weeds choking the knives by throwing the weeds out of the way as the knives advance.

The seventh object is to make the implement readily adjustable to different heights of operators.

The eighth object is to straddle the row and form a complete mulch over the entire surface of the ground except a strip about one half inch wide in the plant row itself, and to render the lower portion of this mulch firm to retard the escape of moisture.

The ninth object is to so construct the device that it can be attached to any of the existing forms of wheeled garden tools having a frame under which such devices may be secured.

The tenth object is to so construct the cultivator that the tendency of the mulching disks is to throw the dirt slightly away from the center.

These and other objects will become more apparent from the specification following as illustrated in the accompanying drawings, in which:

Figure 1 is a perspective view of the cultivator. Figure 2 is a front elevation of a modified form of cultivator adapted to be attached to the frame of a wheeled garden tool. Figure 3 is a horizontal section through the frames showing the angular relation between the sections. Figure 4 is a side elevation of the form of cultivator illustrated in Figure 2. Figure 5 is a transverse section through a plant row showing how a narrow strip of firm earth is left standing around the plants while the remainder is fully pulverized.

Similar numbers of reference refer to the same or similar parts throughout the several views.

Referring first to Figure 1 of the drawings, there is illustrated the ordinary handled frame 10 whose lower end is joined by the slotted brace 11 and the bolt 11$^A$ by means of which the spacing of the ends 12 can be adjusted.

To each end 12 is attached the forked frame of a cultivator section which consists of two members 13 which are secured to the ends 12 by means of the bolts 14. Between each pair of arms 13 is mounted a cylinder 15 from which project the radial spikes 16 which form spiral rows. The cylinder 15 is free to rotate on the bolt 17. At the inner end of each cylinder 15 is a removable disk 18.

Guards 19 are fastened against the inner sides of the inner arms 13 by means of the bolts 20 which can occupy the most convenient holes 21 in the members 19. The pickup arms 22 can also be mounted on the bolts 20 and the end 23 of each arm 22 is provided with a lug 24 which can seat in a corresponding hole in its member 13 to hold the arm 22 rigid. The lower end 22$^A$ of each arm 22 just clears the ground and serves to lift plants 25 to prevent them from being cut off by the disks if used and the plant is leaning or lying on the ground.

To each outer member 13 is secured a perforated arm 26 by means of the bolt 27 and the lower end 26$^A$ of the arm 26 is turned behind the spiked cylinder and forms a horizontal knife which normally operates about one half inch below the surface of the ground. A perforated brace 28 is secured to each member 13 by a bolt 29 and one end of the brace 28 is attached to the perforated end of the arm 26 by means of the bolt 26$^B$. An angular clip 30 is attached to the inner side of each outer member 13 in a manner to keep weeds out of the bearings.

In the form shown in Figures 2 to 4 inclusive, instead of the members 13 there is employed an inverted U shaped frame 31 for each section of the cultivator and the frame sides 32 and 33 carry the guards 19 and the horizontal cutters 26$^A$ but in this case each blade 26$^A$ is positioned by a curved perforated arm 26$^C$ which in turn is held by the radial arm 34 on the bolts 17 and 35. The bolt 36 is used to attach the arm 26$^C$ to the member 33. The frames 31 are attached to the platform 31$^A$ of the wheeled implement 31$^B$.

In this instance a modified form of cylinder is shown including the bolt 37 which forms the axle and the tube 38 on which the cylinder parts are mounted. These include the spikes 39 which are pieces of wire having their mid portion coiled around the tube 38 and have their ends perpendicular to each other. The spikes are spaced laterally by the shells 40 and the spacers 41 as can be seen in Figure 2. Notches are formed in the shell rims for the spikes. If the disk 18 is employed it is placed behind the nut 42. The nut 43 at the opposite end of the tube 38 is inside the last section 40.

The operation is as follows: Assuming that the young plants are in rows the operator uses the device as shown in Figure 1 but without the pickup arms and lines out or outlines on both sides of one row as shown in Figure 5 leaving only a small ridge of about one half inch of firm earth in the plant row so that the roots will not be disturbed. This small strip of earth is easily hand weeded when compared with the large strips left by ordinary cultivators especially those types of implements which work between the rows rather than straddling the rows. If the spiked cylinders strike a clod they pierce it and break it up rather than rolling over it in a manner to make the implement travel unevenly thereby endangering the plants.

If it should rain after the plants are lined out the operation may need to be repeated with the addition of the pickup arms in case the plants have begun to lean. Subsequent operations are performed without the disks or pickup arms since the spikes alone will not injure the plants. The closeness to which the disks 18 can cut to the plant or rather the width of the unweeded strip is determined entirely by the setting of the members 11 and 11$^A$. The position of each guard 19 can also be controlled by placing the bolts 20 in the desired holes 21.

The action of the spiked cylinder is to thoroughly pulverize the ground and the knife cuts the weeds and partially packs the subsoil due to the downward pressure from the cylinders.

I claim:

1. A cultivator having, in combination, a pair of spiked cylinders; a frame for mounting said cylinders; a horizontal knife adapted to travel along the surface of the ground behind said cylinders; disks mounted between said cylinders; and means for adjusting the angularity and cutting depth of said knife.

2. A cultivator having, in combination, a pair of spiked cylinders; a frame in which said cylinders are free to rotate; a disk mounted at the inner end of each cylinder; a pair of pickup arms between said disks; a knife mounted behind each cylinder having means for adjusting its angularity and depth of cut.

3. A cultivator having, in combination, a pair of spiked cylinders; a frame in which said cylinders can rotate when moved along the ground; a disk removably mounted at the inner end of each of said cylinders; a pickup arm mounted at each inner cylinder end; and a horizontal ground engaging knife removably and adjustably mounted behind each cylinder.

4. A cultivator having in combination, a pair of handle members having means at their lower ends for adjustably spacing same, a U shaped frame attached to each handle member; a spiked cylinder journaling across the open ends of each of said frames; the spikes of each cylinder standing radially and in spiral rows and the axes of said cylinders forming an obtuse angle; a disk removably mounted at the inner end of each cylinder; a guard between each disk and its adjacent frame member and pickup arms adapted to be mounted on the inner side of each frame with their lower ends just clearing the surface of the ground.

ADOLPH L. RITTER.